Figure 1:
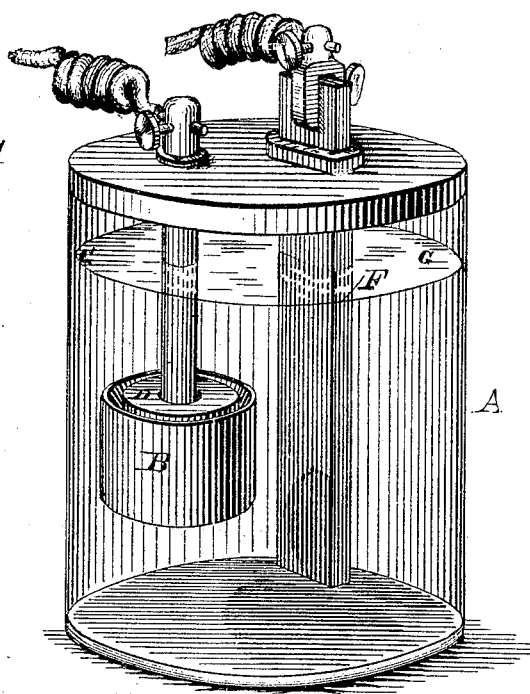

(No Model.)

J. A. BARRETT.
GALVANIC BATTERY.

No. 271,299. Patented Jan. 30, 1883.

Attest
Paul A. Staley
Chas. A. Warren

Inventor
John A. Barrett
By George R. Barton
Attorney

UNITED STATES PATENT OFFICE.

JOHN A. BARRETT, OF CHICAGO, ILLINOIS, ASSIGNOR TO THE WESTERN ELECTRIC COMPANY, OF SAME PLACE.

GALVANIC BATTERY.

SPECIFICATION forming part of Letters Patent No. 271,299, dated January 30, 1883.

Application filed August 21, 1882. (No model.)

*To all whom it may concern:*

Be it known that I, JOHN A. BARRETT, a citizen of the United States, residing at Chicago, in the county of Cook and State of Illinois, have invented a certain new and useful Improvement in Galvanic Batteries, of which the following is a full, clear, concise, and exact description, reference being had to the accompanying drawings, forming a part of this specification.

My invention relates to galvanic batteries in which the negative and positive elements remain unchangeably in contact with the depolarizing-fluid. These are usually called "constant." In the Daniell's battery, which is of this type, the copper plates which form the negative elements are immersed in a solution of sulphate of copper, and the zinc is immersed in a solution of sulphate of zinc, and the two solutions are kept separate by means of porous cups. While this battery is theoretically nearly perfect, certain imperfections are found in practice. In the first place the porous cups introduce considerable resistance; and, secondly, the solution of sulphate of copper, after a short time, comes through, so that the zinc becomes copper-plated. To avoid these imperfections I make my cell without a porous cup, and instead of the two solutions I use bisulphate of mercury in dilute sulphuric acid and suspend the zinc in a rubber cup which contains quicksilver. The quicksilver must be in direct contact with the surface of the zinc, and I prefer to have sufficient quicksilver in the cup to float the zinc. The zinc will thus at the start be thoroughly amalgamated and continue to be thoroughly amalgamated while the battery is in use. Local action is therefore avoided. In the well-known forms of sulphate-of-mercury batteries the zinc tends to extract the mercury, and thus impoverish the solution; but when quicksilver is present, as described, this tendency is reduced to the minimum. Some of the zinc will be dissolved in the mercury in the cup, forming a liquid amalgam, and no matter how soft the zinc may become it is held in the cup, and as long as a very little zinc is present, whether in the solid state or in solution with the mercury, it is useful for the purpose of the battery. There is, therefore, in my battery little or no waste of the material, either zinc or sulphate of mercury. The sulphuric acid which is placed in the solution makes the sulphate of mercury more soluble. When the battery is used only to a moderate extent the presence of sulphuric acid is not required to make the sulphate of mercury go into solution with sufficient rapidity.

Figure 2:
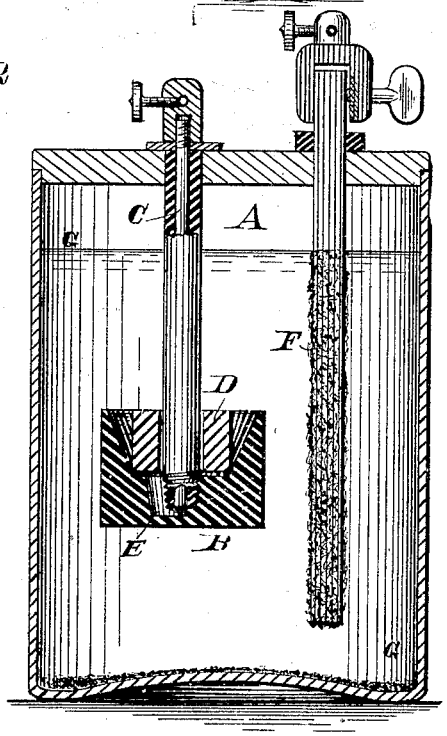

In the drawings, Figure 1 is a perspective view of a cell of a battery embodying my invention. Fig. 2 is a vertical sectional view of the same.

The glass jar A may be of any convenient size or shape. B is the cup of rubber, or other insulating material, suspended by the insulated wire C. The zinc D is placed in the cup B, as shown, and floats in the quicksilver, which must be in direct contact with the surface of the zinc.

In Fig. 2 the rubber or gutta-percha tube of the suspending-wire C is broken away to show portions of the surface of the wire. In order that the connection between the zinc and this wire may always remain perfect, I provide a cavity, as shown at E, in the bottom of the cup, so that the quicksilver may always touch the lower end of the wire C.

The negative element F is carbon, and is shown in Fig. 2 covered with mercury which has been extracted from the solution G G, which consists, as above stated, of bisulphate of mercury in a weak solution of sulphuric acid.

I claim—

1. In a galvanic battery, the combination of bisulphate of mercury in a solution of sulphuric acid, zinc surrounded by quicksilver in a cup of insulating material, and the carbon element, substantially as herein described, and for the purpose specified.

2. The combination of quicksilver with the zinc and the cup provided with a cavity below the surface of the quicksilver, whereby connection is maintained between the zinc and wire, substantially as and for the purpose specified.

3. A galvanic battery, substantially as described, consisting of zinc floating in quicksilver contained in a cup of non-conducting material, in combination with a piece of carbon and a solution of bisulphate of mercury in sulphuric acid.

4. In a galvanic battery in which the positive element consists of zinc immersed in quicksilver, a cup, B, provided with a cavity, E, in combination with an insulated wire, C, substantially as and for the purpose specified.

5. In a galvanic battery, the combination of a cup, B, of insulating material, provided with a cavity, E, and an insulated wire, C, substantially as and for the purpose set forth.

6. The combination of the zinc D, immersed in quicksilver contained in a cup, B, provided with a cavity, E, insulated wire C, carbon F, and a solution of bisulphate of mercury in sulphuric acid, substantially as and for the purpose set forth.

7. In a galvanic battery, the combination of bisulphate of mercury in the solution, amalgam of zinc and quicksilver in a cup of insulating material, and the carbon element, substantially as set forth.

8. In a galvanic battery, the combination of bisulphate of mercury in the solution, zinc and quicksilver in a cup of insulating material, and the carbon element, substantially as described.

9. In a galvanic battery, the combination of zinc immersed in quicksilver, a carbon element, and a solution of bisulphate of mercury, substantially as specified.

10. The combination of a zinc immersed in quicksilver contained in a cup provided with a cavity, and an insulated wire leading therefrom, a carbon element, and bisulphate of mercury in solution, substantially as set forth.

In witness whereof I hereunto subscribe my name this 15th day of August, A. D. 1882.

JOHN A. BARRETT.

Witnesses:
GEORGE P. BARTON,
P. A. STALEY.